Nov. 3, 1959 K. SCHEDL ET AL 2,911,072
HYDRAULIC SHOCK ABSORBER
Filed Aug. 3, 1954 2 Sheets-Sheet 1

INVENTOR.
Karl Schedl
Karl Becker
BY Craig V. Morton
His Attorney

INVENTOR.
Karl Schedl
Karl Becker
BY
His Attorney

United States Patent Office 2,911,072
Patented Nov. 3, 1959

2,911,072

HYDRAULIC SHOCK ABSORBER

Karl Schedl and Karl Becker, Russelsheim (Main), Germany, assignors to General Motors Corporation, Detroit, Mich., a corporation of Delaware Application August 3, 1954, Serial No. 447,559

11 Claims. (Cl. 188—88)

The invention relates to a shock absorber with a reciprocable piston mounted on a piston rod and arranged in a working cylinder filled with pressure means.

This shock absorber operates in such a manner that the pressure means is adapted to flow between the opposite sides of the piston and also between the working cylinder and a compensating chamber through channels in the piston and through a valve between the working cylinder and said compensating chamber. The said channels are provided with movable valve members which may be under the influence of springs, said valve members being responsive to the pressure of the pressure means flowing through said channels.

If such shock absorbers are employed, for instance, in motor vehicles, they will with certain conditions of the roads, especially when driving over secondary roads, transmit quickly successive hard shocks onto the chassis or body. This characteristic of the shock absorbers which heretofore has been attributed to the shock absorbers, becomes rather bothersome to the passengers of the vehicle, when it continues over a period of time. The automobile body or parts thereof may furthermore be caused to drone to a particularly great extent. The hard shocks quickly succeeding each other may be explained by the fact that the pressure means of the shock absorber does not have sufficient time to open the valves in the channels of the piston and to pass therethrough. As a result thereof, the shock absorber action under the said certain road conditions is like a rigid connection between the axle and the automobile body.

These drawbacks have been eliminated by the present invention due to the arrangement of slidably and elastically journalling the piston of the shock absorber on the piston rod.

Furthermore, according to the present invention the slidably and elastically journalled piston is designed as throttle slide for the pressure means of the shock absorber so that a particularly simple and advantageous construction is obtained.

Further details of the invention will appear from the following specification in connection with the accompanying drawings, in which.

Figure 1:
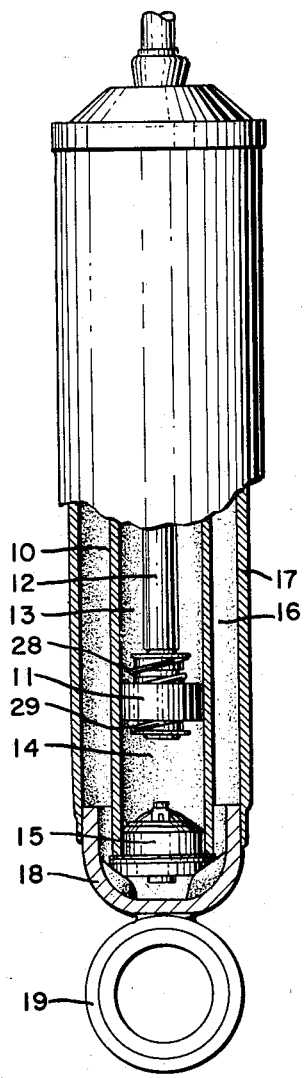
Fig. 1 illustrates a view, partly in longitudinal section, of a hydraulic shock absorber with built-in piston in conformity with the invention.
Figure 2:
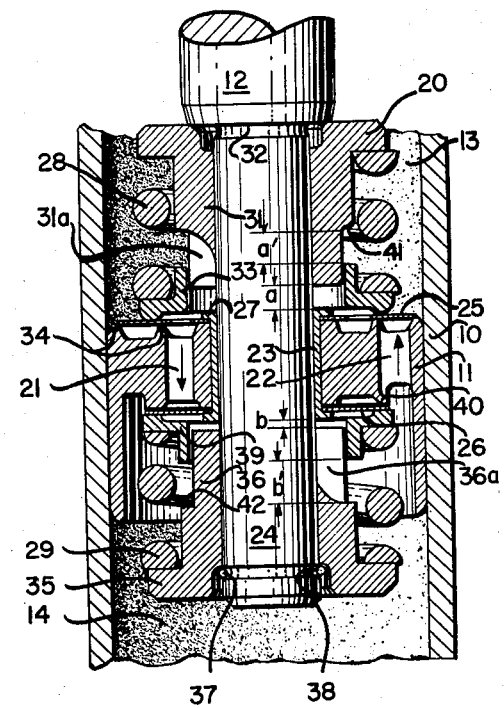
Fig. 2 illustrates on a somewhat larger scale than that of Fig. 1 a section through the mounting of the piston.

The shock absorber illustrated in Fig. 1 comprises a working cylinder 10 having reciprocably mounted therein a piston 11. The piston 11 is mounted on a piston rod 12 which extends out of the chamber 13 at the upper end of the shock absorber and is connected with the body of the vehicle in the customary manner.

The chamber 14 of the working cylinder 10, which chamber is located on the other side of the piston, has its lower end closed by a valve 15. This valve 15, of a type known per se, separates the chamber 14 from the compensating chamber 16. The compensating chamber 16 surrounds the working cylinder 10 and is confined by the cylinder 17. The cylinder 17 has its lower end closed by means of a cap 18 welded thereto and is and is connected with the non-cushioned parts of a motor vehicle by means of a ring 19 or the like.

When the piston 11 moves downwardly, first the pressure fluid means in the chamber 14 passes, for instance, through a valve in piston 11 into the chamber 13 which cannot store the entire quantity of pressure fluid means of said chamber 14 because the chamber 13 is smaller than the chamber 14 by the volume of the piston rod 12. With increasingly hydraulic pressure, eventually valve 15 opens so that the excessive pressure fluid means passes into the compensating chamber 16. When piston 11 moves upwardly, first the pressure fluid means in chamber 13 passes into the chamber 14. When the entire quantity of pressure fluid means has passed from chamber 13 into chamber 14, the latter is not completely filled because a portion of the pressure fluid means is in the compensating chamber 16 into which it was passed during the downward movement of piston 11. When the piston 11 continues its upward movement, the pressure in chamber 14 decreases so that now the fluid pressure means in the compensating chamber 16 passes through valve 15 into the chamber 14.

As will be evident from the embodiment shown in Fig. 1, piston 11 is provided with a plurality of bores or passages 21 which may be called the inner passages, and is furthermore provided with a plurality of bores or passages means 22, which may be called the outer passages. Furthermore, the piston 11 has a central bore and by means of a bushing 23 is slidably mounted upon the lower piston rod end 24 of piston rod 12, which lower end has a somewhat reduced diameter. In front and behind the passages 21 and 22 of the piston 11 there are provided valve members, preferably valve discs 25 and 26 which are so arranged that the flow of the pressure fluid means takes place from the chamber 13 into chamber 14 through the inner passages 21, whereas the flow of the pressure fluid means from chamber 14 into chamber 13 takes place through the outer passage means 22. Due to the flanges 27 of the bushing 23, the valve discs 25 and 26 are fixedly connected with the piston 11 and thus form therewith a unit adapted to be installed as a package unit. Operation and design of the valve discs 25 and 26 are known per se and do not form a part of the present invention. In conformity with the invention, the piston 11 rests upon the piston rod 12, 24, through the intervention of springs 28 and 29. The upper spring 28 has one end thereof resting against the flange 20 of the bushing or sleeve 31 so that said flange is pressed against the collar 32 of piston rod 12. The lower end of the upper spring 28 presses against a seat or plate 33 which is slidably mounted on the sleeve 31. The force of spring 28 is simultaneously taken advantage of for pressing the valve disc 25 against the surfaces 34 of the piston 11.

Similar conditions prevail on the other side of the piston. In this instance, the lower end of spring 29 presses against flange 35 of sleeve 36. The sleeves 31 and 36 are shaped alike when producing a great quantity of these parts. The ends of the sleeves 31 and 36 have milled thereinto slots 31a and 36a which extend in longitudinal direction of said sleeves. The purpose of these slots consists in assuring an unimpeded passage for the pressure fluid means. The spring ring 38 arranged in the annular groove 37 secures the sleeve 36 to the lower end of the piston rod 24. The other end of spring 29 presses against the seat or plate 39 which similar to plate 33 is slidably mounted on the sleeve 36. Also in this instance, the force of spring 29 presses the valve disc 26 against a surface 40 of the piston 11.

When the shock absorber is collapsed due to a shock encountered by the vehicle or, in other words, when the piston rod 12 moves downwardly, the piston 11 substantially remains in its position relative to the working cylinder 10 until the piston rod 12, 24 has moved over the distance $a$ and then the full force of the pressure fluid means acts upon the piston 11. The pressure in chamber 14 increases and valve 25 is lifted off its seat 34. The pressure fluid means can now pass into the chamber 13 through the outer passages 22 in conformity with the characteristic of the valve disc 25. The valve disc 25 may also be so designed that it is lifted off from its seat 34 before the piston rod 12, 24 has moved over the distance $a$.

In the case of particularly severe impact movements, after the sleeve 31 has struck the flanged edge 27 of the bush 23 the pressure within the space 14 will rise to such an extent that the valve disc 25 will be forced back with the plate 33 against the pressure of the spring 28. This gives an increased cross section of passage for fluid flow and an increased resistance to such fluid flow. To limit the opening of the valve disc 25, a shoulder 41 is formed on the sleeve 31 against which shoulder the plate 33 abuts in its limit position. The distance $a^1$ between the shoulder 41 and the plate 33 in the mid position is somewhat greater than the distance $a$ between the bush 23 and the end of the sleeve 31 so as to permit relative movement between the plate 33 and the sleeve 31 after the sleeve 31 has struck the bush 23.

Principally, correspondingly similar operations occur when the shock absorber is pulled apart during the so-called reaction or reactionary shock or, in other words, when the piston rod 12, 24 moves upwardly. The piston 11 remains relative to the working cylinder 10 substantially in its position until the piston rod 12, 24 has moved over the distance $b$ and then full force is acting upon piston 11 through sleeve 36. The pressure in chamber 13 thus increases and the valve disc 26 is lifted off from its seat 40. Thereupon the pressure fluid means can pass into the chamber 14 through the inner passages 21. If particularly strong reactionary shocks are encountered, also in this instance, the plate 39 hits against the collar 42 of the sleeve 36.

Inasmuch as the distance $b^1$ is somewhat greater than the distance $b$, also in this instance the plate 39 can move further downwardly against increasing thrust of the spring 29 resulting in the valve disc 26 providing an increased cross sectional passage for the pressure fluid means against increasing resistance to such fluid flow. The distances $a$ and $b$ may either be the same or different from each other. Thus, for instance, it is advantageous to make the distance $a$ greater than the distance $b$ so that when a shock is encountered during which the shock absorber is supposed ordinarily to produce a small braking force, the damping or shock absorbing effect will start somewhat later than will be the case with the opposite movement, i.e. during the reactionary shock.

Figure 3:
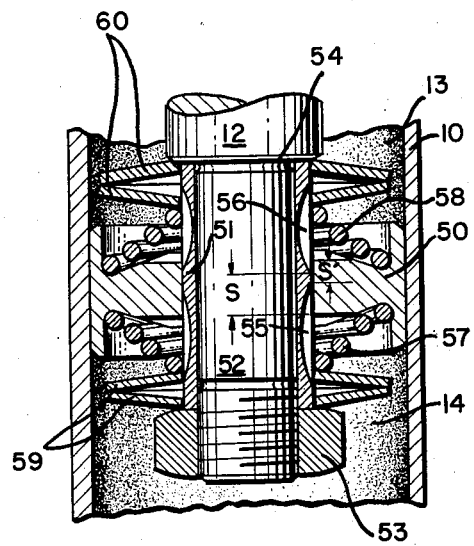
Fig. 3 illustrates on a scale likewise larger than that of Fig. 1 a bearing arrangement of the piston which is somewhat modified over that of Fig. 2.

A further embodiment of the invention is illustrated in Fig. 3 according to which the slidably mounted piston 50, which is under the influence of a spring is designed as throttle slide for the pressure fluid means of the shock absorber. The piston 50 is movable on a spacer sleeve 51 which surrounds the lower end 52 of piston rod 12 (which lower end has a reduced diameter) and by means of the nut 53 is pressed against the collar 54 of the piston rod 12. The spacer sleeve 51 has provided a plurality of arc-shaped control slots 55 and 56, which are evenly distributed over the circumference of sleeve 51.

The slidably journalled piston 50 rests between and against the collar 54 and nut 53 through the intervention of truncated cone-shaped springs 57 and 58 and spring seats 59 and 60.

When the shock absorber is compressed while encountering a shock, or, in other words, when the piston rod 12 moves downwardly, the piston 50 first remains in its position so that the spring 58 is compressed. As soon as the piston rod 12, 25 has moved over a distance $s$ relative to the piston 50, the slidably journalled piston 50 opens up a connection between the two piston sides. The pressure fluid means now can pass from chamber 14 through the control slots 56 into the chamber 13. Depending on the extent or hardness of the shock, the control slots 56 offer the pressure fluid means a smaller or greater cross sectional passage. Due to the employment of two serially arranged springs (one behind the other) namely the truncated cone-shaped spring 58 and the disc spring 60, a progressive spring effect is obtained in such a manner that first substantially the spring 58 determines the distance over which piston 50 moves and, after the said spring has been entirely or almost entirely compressed to block height, the stronger spring disc 60 will continue the control step.

Figure 4:
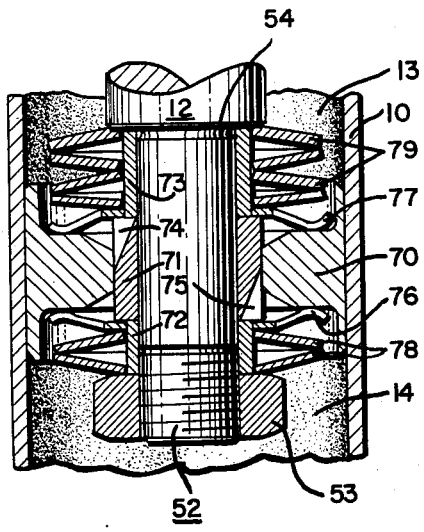
Fig. 4 is a further modification of the supporting arrangement for the piston which is somewhat similar to that of Fig. 3.

Similar conditions prevail when the shock absorber is pulled apart during the so-called reactionary shock. As soon as the piston rod 12, 52 has moved over the distance $s^1$ relative to the piston 50, the slidably journalled piston 50 establishes a connection between the two piston sides through slots 55. The pressure fluid means now can pass from chamber 13 into chamber 14 through the control slots 55. The cone-shaped spring 57 and the disc springs 59 have the same effect on the lower piston side as described above. Journalling of a piston in another modified arrangement is illustrated in Fig. 4. The piston 70 is movable on a control sleeve 71. The sleeve 71 is by means of two spacer sleeves 72 and 73 held on the reduced end 52 of the piston rod 12 between the collar 54 of piston rod 12 and nut 53.

The control sleeve 71 has a plurality of axially extending slots 74 and 75 which start at the central section of the sleeve and extend in the direction toward the upper and lower end surface of the control sleeve 71 while the depth of said slots increases toward said end surfaces.

The piston 70 rests against the collar 54 and nut 53 through the intervention of star-shaped springs 76 and 77 and disc springs 78 and 79. The operation is the same as that described in connection with the embodiment of Fig. 3.

Figure 5:
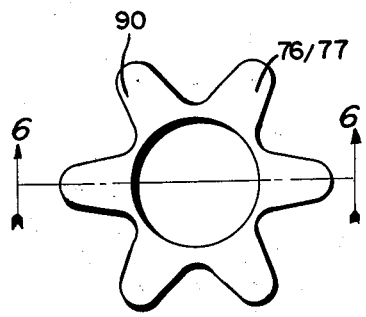
Fig. 5 represents a star-shaped spring for use in connection with the embodiment of Fig. 4.
Figure 6:
Fig. 6 represents a section through said star-shaped spring along the line 6—6 of Fig. 5.

The star-shaped springs 76 and 77 (see Figs. 5 and 6) correspond in their construction to that of the disc springs. In order to make said disc shaped springs soft and yieldable, these springs have been given star shape so that only the arms 90 will spring. The disc springs 78 and 79 (Fig. 4) may be arranged in any convenient manner. Thus, for instance, it may be advantageous for the reactionary shock side of the shock absorber to arrange the disc springs 79 entirely or partially in parallel layers and/or in series so that a progressive spring characteristic graph will be obtained therefor.

Furthermore, the operation of the shock absorber may be influenced by arranging differently strong springs on the two sides of the piston. Furthermore, the position of the control slots 55, 56 and 74, 75 may be varied to vary the cross sectional passage for the fluid pressure means in conformity with the position of the piston.

Finally, the control slots for the two piston movements may also be provided with different width so that they will bring about different braking effects during the shock and reactionary shock respectively.

Depending on the desired employment and the desired effect and also depending on the circumstances governing the production, the designer has a plurality of structural possibilities to choose from. The embodiments shown in the drawings illustrate shock absorbers by means of which the short strong, but hard shocks such as encountered with certain road conditions will be completely kept away from the body, which fact materially increases the driving comfort.

While the form of embodiment of the invention as herein disclosed constitutes a preferred form, it is to be understood that other forms might be adopted as may come within the scope of the claims which follow.

What is claimed is as follows:

1. A double acting shock absorber having a piston carried on a piston rod with the piston slidable in a working cylinder closed at both ends and containing pressure fluid for displacement between opposite sides of the piston through valved passages having valves on opposite sides of the piston urged by spring means to close the passages and through a valve between one end of the working cylinder and a compensating chamber, characterized in that the piston is slidably mounted on the piston rod for limited movement of the piston on the rod against stationary stops at either side of the piston on initial compression of the fluid in said cylinder on either side of the piston and is retained in an at rest position between the limits of its sliding movement on the rod normally at times of no movement between the rod and piston by the valve spring means on opposite sides of the piston opposing each other.

2. A shock absorber according to claim 1, characterized in that the piston moves against the valve spring means in either direction of its reciprocation on the rod a predetermined distance before the passages are opened to provide for pressure flow of fluid between opposite sides of the piston.

3. A shock absorber according to claim 1, characterized in that the piston moves against the valve spring means in either direction of its reciprocation on the rod a predetermined distance before the passages are opened to provide for flow of fluid in either direction between opposite sides of the piston wherein the spring means proportionately increases its resistance to movement of the piston as the passages are increasingly opened.

4. A shock absorber according to claim 1, characterized in that the piston moves against the valve spring means in either direction of its reciprocation on the rod a predetermined distance before the passages are opened to provide for flow of fluid in either direction between opposite sides of the piston and wherein the travel of the piston is greater in one direction than in the other for greater compression of the valve spring means in the said one direction before opening of the passages.

5. A shock absorber according to claim 1, characterized in that the piston moves against the valve spring means in either direction of its reciprocation on the rod a predetermined distance before the passages are opened to provide for flow of fluid in either direction between opposite sides of the piston and wherein the travel of the piston relative to the rod is greater on the compression stroke of the piston than on the rebound or reaction stroke thereof.

6. A double acting hydraulic shock absorber comprising, a working cylinder closed at one end thereof, a piston slidable in said working cylinder and having a piston rod extending through the said closed end of the cylinder, means forming a fluid reservoir adjacent said working cylinder, the opposite end of said cylinder having a valve providing for pressure flow of fluid between the said cylinder and said reservoir in one direction and substantially free flow in the opposite direction, said piston being slidably disposed on said piston rod at one end thereof, means forming valved passages providing for flow of pressure fluid between opposite sides of said piston, valve means at opposite sides of said passages closing said passages, and oppositely acting spring means at opposite sides of said piston urging said valve means closed and positioning said piston in an at rest position between the limits of its movement relative to said rod, and stationary stop means at each side of said piston providing for stationary positioning of the piston against compression of the fluid in said cylinder on either side of said piston at the end of the limited movement of the rod relative to said piston.

7. A shock absorber comprising, a working cylinder closed at one end, a piston reciprocable in said working cylinder having passages therein for flow of fluid between opposite sides of the piston, said piston being carried on one end of a piston rod that extends through said closed end of said cylinder, a reservoir or compensating chamber adjacent said cylinder, the opposite end of said cylinder having valve means providing for reversible flow of fluid between said cylinder and said reservoir, said piston rod having the end thereof within said cylinder of reduced diameter, said piston being reciprocable on said reduced diameter portion of said rod, sleeves disposed on said rod reduced diameter portion at opposite sides of said piston in spaced relationship relative to each other and to said piston providing for limited reciprocal movement of said piston on said rod between said sleeves, said piston having valves at each side thereof closing said passages, spring seat members engaging said valves at each side of said piston, compression springs between the spring seat members and the respective sleeves at each side of said piston, said springs opposing each other to dispose said piston in an at rest position in spaced relationship to the ends of either of said sleeves and provide for spring pressure on said valves to retain the same in closed position.

8. A shock absorber according to claim 7 in which said sleeves form an abutment engageable by the spring seat adjacent thereto to limit the movement of the spring seat relative to said piston.

9. A hydraulic shock absorber having a piston reciprocable on a piston rod in limited axial movement thereon and reciprocably disposed in a working cylinder containing a pressure fluid means that is adapted to flow between opposite sides of the piston and is adapted to flow between the working cylinder and a reservoir or compensating chamber, said piston having passages therein providing for flow of fluid between opposite sides of the piston, said working cylinder having a valve between it and the reservoir to provide for flow of fluid therebetween, said passages of said piston being provided with movable valve members for opening and closing the passages and which are responsive to the pressure of the pressure fluid passing through the passages for opening of the valves, sleeves on said piston rod on opposite sides of said piston in spaced relationship relative thereto and forming abutments engaged by said piston to limit reciprocal movement of said piston on said rod, and opposing spring means placed at opposite sides of the piston between the piston and the sleeves holding said valves closed and positioning said piston in an at-rest position between the limits of its reciprocal movement established by said sleeves.

10. A shock absorber according to claim 9 in which the said spring means positions said piston between said sleeves for lesser travel in one direction than in the other from an at-rest position as retained thereby by said spring means.

11. A shock absorber according to claim 10 in which the said lesser travel is that on the rebound or reaction stroke of the piston.

References Cited in the file of this patent

UNITED STATES PATENTS 821,359     Haeberlein              May 22, 1906

(Other references on following page)

UNITED STATES PATENTS

| | | |
|---|---|---|
| 1,268,452 | Goodyear | June 4, 1918 |
| 2,045,027 | Sanford | June 23, 1936 |
| 2,320,314 | Trask | May 25, 1943 |
| 2,472,841 | Ochs | June 14, 1949 |
| 2,571,279 | Myklestad | Oct. 16, 1951 |
| 2,655,233 | Funkhouser et al. | Oct. 13, 1953 |
| 2,792,914 | Benard | May 21, 1957 |

FOREIGN PATENTS

| | | |
|---|---|---|
| 838,403 | Germany | May 8, 1952 |
| 554,732 | Great Britain | July 16, 1943 |
| 693,660 | Great Britain | July 1, 1953 |